United States Patent

Plichta

[11] Patent Number: 5,964,303
[45] Date of Patent: Oct. 12, 1999

[54] PROCESS AND A DEVICE FOR ESTABLISHING DRILLING HOLES

[75] Inventor: Peter Plichta, Düsseldorf, Germany

[73] Assignee: Klaus Kunkel, Ratingen, Germany

[21] Appl. No.: 08/849,420

[22] PCT Filed: Sep. 10, 1996

[86] PCT No.: PCT/DE96/01693

§ 371 Date: Jun. 27, 1997

§ 102(e) Date: Jun. 27, 1997

[87] PCT Pub. No.: WO97/10410

PCT Pub. Date: Mar. 20, 1997

[30] Foreign Application Priority Data

Sep. 12, 1995 [DE] Germany ............................ 195 33 765

[51] Int. Cl.[6] ........................................................ E21B 7/14
[52] U.S. Cl. .................................................. 175/14; 175/17
[58] Field of Search .................................. 175/11, 14, 17

[56] References Cited

U.S. PATENT DOCUMENTS

| 2,882,016 | 4/1959 | Aitchison et al. ......................... 175/14 |
| 3,093,197 | 6/1963 | Freeman, Jr. et al. .................... 175/14 |
| 4,099,584 | 7/1978 | Frankle et al. ............................. 175/14 |

FOREIGN PATENT DOCUMENTS

| 1115203 | 10/1961 | Germany . |
| 2153954 | 5/1973 | Germany . |
| 195 33 765 C1 | 10/1996 | Germany . |

OTHER PUBLICATIONS

Oil and Gas Journal, vol. 54, No. 14, Aug. 8, 1955, p. 67.
Journal of Petroleum Technology, Apr. 1960, pp. 61 to 74, XP000614501.
McGhee; "New Down–Hole Tool"; Oil and Gas Journal; vol. 54, No. 14, p. 67; Aug., 1955.
Ledgerwood, Jr.; "Efforts to Develop Improved Oilwell Drilling Methods"; Journal of Petroleum Technology; vol. 219; Apr. 1960; pp. 61–74.

Primary Examiner—Hoang C. Dang
Attorney, Agent, or Firm—Herbert Dubno

[57] ABSTRACT

The description relates to a process and a device for drilling holes in hard rocks like granite, in which the rock to be drilled is exposed to a flame produced by gaseous hydrogen and fluorine together and the reaction products produced by the flame are taken out of the drilling with the aid of a sucked aqueous liquid. In order to be able to implement the process economically while preventing the formation of toxic and corrosive reaction products, the aqueous liquid used to remove the reaction products formed is a lye, e.g. a sodium hydroxide solution, in which the excess hydrogen fluorine formed during the combustion of hydrogen and fluorine is converted into a non-toxic fluoride, e.g. sodium fluoride, while at the same time the other reaction products are converted into water-soluble silicates, aluminates and alkaline fluorides. In order to recover the very expensive gaseous fluorine used, the dissolved sodium fluoride formed by chemical reaction is converted into insoluble calcium fluoride with the aid of calcium oxide or calcium hydroxide and subsequently electrolysed.

6 Claims, 1 Drawing Sheet

PROCESS AND A DEVICE FOR ESTABLISHING DRILLING HOLES

CROSS REFERENCE TO RELATED APPLICATIONS

This application is a national stage of PCT/DE96/01693 filed Sep. 10, 1996 and based upon German application 195 33 765.4 of Sep. 12, 1995 under the International Convention.

FIELD OF THE INVENTION

The present invention is directed to a process for establishing drilling holes in hard rock, as for instance granite, by exposing the rock to be drilled to a flame formed by bringing together hydrogen gas and fluorine gas and sucking off the reaction products formed by the flame by means of an aqueous liquid from the already established drilling hole. The invention also relates to a device for implementing this process.

BACKGROUND OF THE INVENTION

A chemical process is already known (see German patent no. 21 53 954) according to which rock can be chemically cut or its surface can be chemically processed. According to this process hydrogen and fluorine are supplied to a burner of the type of a Daniel cock. The developing hydrogen fluoride has a temperature of about 4000° C. and splits up the present silicon-oxygen linkage and aluminum-oxygen linkage of the rock so that a clean cut is developed. However, this process to convert all the components of rock into gaseous fluorides and H$_2$O vapor with hydrogen fluoride has nothing to do with a process according to which solid reaction products are blown away, as is the case, for instance, processing rock with an oxygen lance.

Furthermore, it is mentioned in the above-cited patent that the developing hydrogen fluoride is toxic and is blown into the atmosphere according to the principle of a vacuum cleaner. Moreover, the possibility is mentioned to use the hydrogen fluoride flame under water which, however, has the result of the formation of very toxic hydrofluoric acid.

OBJECT OF THE INVENTION

It is the object of the present invention to provide a process for establishing drilling holes, especially for prospecting for and/or exploitation of crude oil, which can be implemented with relatively low cost in a very simple manner with the avoidance of toxic and/or corrosive reaction products.

SUMMARY OF THE INVENTION

According to the invention this object is attained in that the aqueous liquid serving for the removal of the formed reaction products is a lye, preferably sodium hydroxide solution (soda lye), in which the excess hydrogen fluoride formed during the combustion of hydrogen and fluorine is converted into a nontoxic fluoride, such as sodium fluoride, while simultaneously the other gaseous reaction products are converted into water-soluble silicates, aluminates and alkaline fluorides.

In preferred embodiments of the inventive process the concentrated salt solution sucked off from the drilling hole is collected and that the fluorides are precipitated from this salt solution as calcium fluoride through the addition of calcium oxide or calcium hydroxide, and that the fluorine gas is recovered through a fluorine recirculation by the use of electrical energy. The supply of fresh lye to the drilling hole and the sucking-off of the salt solution is controlled in response to the output signals by pH probes provided in the supply range and at the sucking location.

Emanating from German patent no. 21 53 954, the gist of the present invention resides in the provision of a lye, preferably of a sodium hydroxide solution (soda lye), in the region of the flame formed by bringing together the hydrogen gas and the fluorine gas. In this lye the very toxic gases generated by the conversion with hydrogen fluoride are chemically bound. These gases are primarily the fluorides of silicon, aluminum and potassium. Other metallic ions present in the rock of the earth, as for instance sodium, magnesium, iron, calcium etc., are also converted to fluorides. By the effect of hot hydrogen fluoride, carbonates which may be present are also decomposed into gaseous components. All the formed fluorides and the excess hydrogen fluoride as well as carbon dioxide which is possibly formed are converted in this manner to a concentrated salt solution by the lye introduced down into the lower region of the drilling hole. The supply of fresh lye can be controlled by the use of pH probes in such a manner that the pumped-off salt solution has always a constant concentration.

This concentrated salt solution can be subsequently reacted with calcium hydroxide. The poorly soluble calcium fluoride is generated which can be separated by filter pressing. Since calcium fluoride is a basic product for the winning of fluorine, it can be reprocessed for fluorine recycling by means of electrical energy.

A device for implementing the inventive process comprises a drilling device substantially consists of a drilling head hanging from a steel rope and provided with a central burner and an annular burner collar and corresponding outlet apertures. This drilling head is connected with corresponding conduits through which hydrogen gas, fluorine gas, lye and cooling water are supplied to the drilling head.

BRIEF DESCRIPTION OF THE DRAWING

The above and other objects, features, and advantages will become more readily apparent from the following description, reference being made to the accompanying drawing in which.

Figure 1:
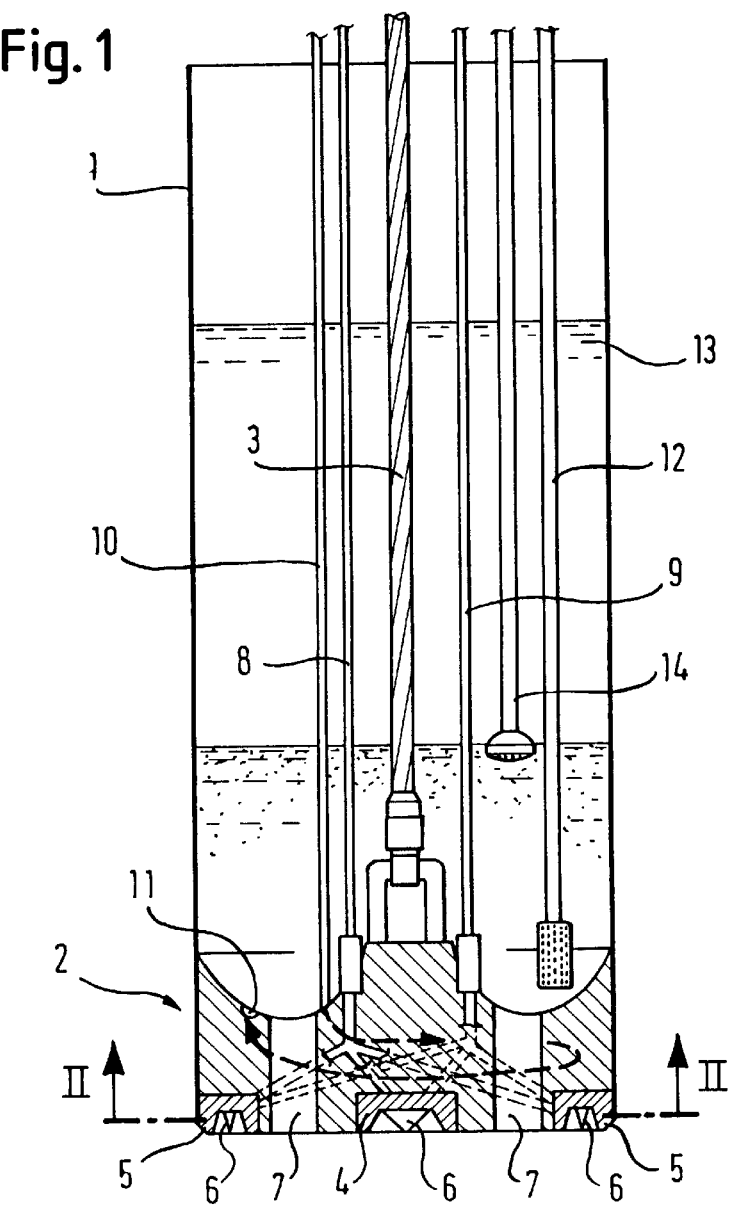
FIG. 1 is a schematical vertical sectional view of a drilling hole which has been established with the inventive process.
Figure 2:
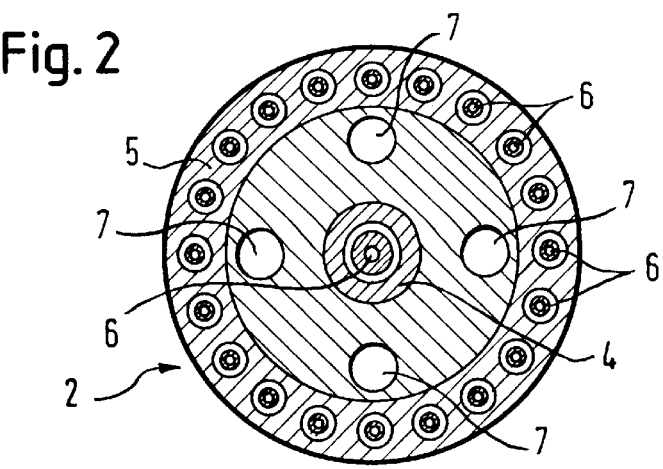
FIG. 2 is a horizontal sectional view along line II—II of FIG. 1.

If a drilling hole is to be established within the ground, for instance for crude oil prospecting purposes, with conventional (for instance hydraulic) drilling methods at first a hole is drilled through the ground until the primary rock has been reached. Then, according to FIG. 1, this hole is secured by means of a jacket 1 of steel or of armoured concrete. Thereafter, a drilling head 2 formed according to the invention is let down by means of a steel rope 3 through the drilling hole established in this manner. This drilling head 2 has a central burner 4 as well as an outer annular burner collar 5 with nozzles 6 through which hydrogen gas and fluorine gas are supplied. Hydrogen fluoride gas flames having a temperature of about 4000° C. are generated by self-ignition. The rock material is excavated by these flames through chemical reaction with the generated hydrogen fluoride. Between the burners 4 and 5 the drilling head 2 has a collar or ring of apertures 7 through which the generated gaseous fluorides, water vapor, excess hydrogen fluoride as well as possibly formed carbon dioxide can escape under pressure. The pressure existing in the range of the reaction flame below the drilling head 2 has the effect that the drilling head 2 is located on a gas cushion. A plurality of conduits of pipes or hoses 8 to 10 are connected to the drilling head 2. The supply of the hydrogen gas 8 and of the fluorine gas 9 as well as the supply of cooling water 10 for the burners 4, 5 is realized by means of these conduits or hoses. The drilling head 2, the burners 4, 5 and especially the apertures 7 have to be permanently cooled on account of the enormous heat. The cooling water leaves the drilling head 2 through the exits 11.

Finally, a pipe 12 extends along the steel rope 3 into the region above the drilling head 2 by which pipe fresh sodium hydroxide solution (soda lye) is supplied. A liquid column 13 with the height of several meters is located above the drilling head 2 and weights on the drilling head 2. Another pipe 14 terminates with a variable distance from the supply line 12 in order to pump off the generated salt solution.

As soon as the burners 4, 5 of the drilling head 2 have been activated, in the range of the drilling location large amounts of toxic and gaseous fluorides are generated, above all silicon fluorides, potassium fluorides and aluminum fluorides, wherein additionally excess hydrogen fluoride and water vapor are released. The very hot gases enter through the apertures 7 into the region of the liquid column 13 situated above the drilling head 2. By the supply of soda lye the silicon fluoride, the aluminum fluoride and the excess hydrogen fluoride react for the formation of water-soluble silicates, aluminates and alcaline fluorides. The soda lye introduced by means of the drilling head 2 is converted into a concentrated salt solution in this manner. pH probes control the continuous supply of soda lye and also the pumping-off of the hot salt solution.

Heat is released by the formation of salt. Simultaneously the very hot gases transfer their energy in the supply region of the soda lye. Accordingly, it cannot be avoided that the soda lye and the liquid column or water column 13 thereabove begin to boil. However, by the boiling process very much heat is removed from the system so that only a certain amount of vaporized water has to be replaced.

Within the scope of the invention the concentrated salt solution sucked off from the drilling hole is collected in corresponding containers and is converted with calcium oxide or calcium hydroxide. The precipitated calcium fluoride can be collected in order to carry out in this manner a recovering of the fluorine chemically bound in the concentrated salt solution in a fluorine plant. Since within a drilling hole consisting of solid rock practically no losses at all of fluorine compounds occur, a substantially complete fluorine recirculation can be realized so that, when carrying out the inventive process, only a certain consumption of energy, hydrogen and water occurs.

Instead of soda lye the inventive process can be implemented with other lyes, for instance caustic potash solution or lye of lime (calcium hydroxide), too. With the process cited at last calcium fluoride is directly developed which can be sucked off as slurry.

Since no drilling rods along which larger torques have to be transferred are necessary for implementing the inventive process and since the drilling head 2 to be used according to the invention can be also constructed with a very small diameter, the inventive process is especially suited for the establishment of very deep test drillings in solid rock whereby the costs of the prospection of crude oil can be correspondingly reduced. In order to keep the diameter as small as possible it can be practical to use the soda lye introduced into the drilling hole simultaneously for cooling the drilling head 2.

If a test drilling becomes successful, the drilling hole can be enlarged with a correspondingly wide hydrogen fluoride burner.

I claim:

1. A process for drilling a hole in hard rock, comprising the steps of:
   (a) combining gaseous hydrogen and gaseous fluorine to form a hydrogen fluoride flame and reacting hard rock therewith to form gaseous reaction products and propagate a hole in said hard rock thereby;
   (b) drawing excess hydrogen fluoride and said gaseous reaction products from said hole; and
   (c) collecting said gaseous reaction products in an aqueous lye solution converting said excess hydrogen fluoride to a nontoxic fluoride and said gaseous reaction products into water-soluble silicates, aluminates and alkaline fluorides.

2. The process defined in claim 1 wherein said aqueous lye solution is an aqueous sodium hydroxy solution and said non-toxic fluoride is sodium fluoride.

3. The process defined in claim 2 wherein said hard rock is granite.

4. The process defined in claim 3 wherein said aqueous lye solution in step (c) forms a concentrated salt solution, said method further comprising the steps of precipitating calcium fluoride from said concentrated salt solution by the addition of calcium oxide or calcium hydroxide thereto; and generating fluorene gas from said calcium fluoride by the use of electrical energy.

5. The process defined in claim 4 wherein the supply of said aqueous lye solution and removal of said concentrated salt solution are controlled in response to output signals of pH probes in supply and withdrawal regions.

6. An apparatus for drilling a hole in hard rock by the steps of:
   (a) combining gaseous hydrogen and gaseous fluorine to form a hydrogen fluoride flame and reacting hard rock therewith to form gaseous reaction products and propagate a hole in said hard rock thereby;
   (b) drawing excess hydrogen fluoride and said gaseous reaction products from said hole; and
   (c) collecting said gaseous reaction products in an aqueous lye solution converting said excess hydrogen fluoride to a nontoxic fluoride and said gaseous reaction products into water-soluble silicates, aluminates and alkaline fluorides;
   said apparatus comprising:
      a drilling head suspended in said hole from a steel rope provided with a central burner, an annular burner collar and outlet apertures;
      respective conduits through which hydrogen gas and fluorene gas are supplied to said central burner;
      means for supplying said aqueous lye solution to said outlet apertures; and
      means for supplying cooling water to said drilling head.

* * * * *